United States Patent
Ose

(10) Patent No.: US 6,553,861 B2
(45) Date of Patent: Apr. 29, 2003

(54) SWITCH STYLE BICYCLE SHIFT CONTROL DEVICE

(75) Inventor: Kenji Ose, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/992,279

(22) Filed: Nov. 14, 2001

(65) Prior Publication Data

US 2002/0033064 A1 Mar. 21, 2002

Related U.S. Application Data

(62) Division of application No. 09/519,014, filed on Mar. 3, 2000.

(51) Int. Cl.⁷ .............................................. F16C 1/12
(52) U.S. Cl. ...................................... 74/502.2
(58) Field of Search ............................. 74/500.5, 501.6, 74/502.2, 473.13, 473.14, 473.3

(56) References Cited

U.S. PATENT DOCUMENTS

| | | | |
|---|---|---|---|
| 3,082,642 A | 3/1963 | Hammerand | |
| 3,398,600 A | 8/1968 | White et al. | |
| 3,633,437 A | 1/1972 | Ishida | 74/489 |
| 3,766,793 A | 10/1973 | Knop | |
| 3,965,763 A | 6/1976 | Wechsler | 74/217 B |
| 4,065,983 A | 1/1978 | Mimura | 74/625 |
| 4,205,558 A * | 6/1980 | Juy | 74/502.2 |
| 4,319,673 A | 3/1982 | Kojima | 192/4 R |
| 4,325,267 A | 4/1982 | Kojima | 74/489 |
| 4,360,718 A | 11/1982 | Schobinger et al. | 200/61.88 |
| 4,535,644 A * | 8/1985 | Coue | 74/502.2 |
| 4,768,395 A | 9/1988 | Tagawa | |
| 5,023,417 A | 6/1991 | Magiera | 200/331 |
| 5,429,012 A * | 7/1995 | Ikeda et al. | 74/473.13 |
| 5,433,126 A | 7/1995 | Corbett | 74/501.6 |
| 5,437,206 A | 8/1995 | Boor | 74/489 |
| 5,588,331 A | 12/1996 | Huang et al. | |
| 5,601,001 A | 2/1997 | Kawakami et al. | 74/502.2 |
| 5,676,022 A | 10/1997 | Ose | 74/502.2 |
| 5,678,455 A | 10/1997 | Watarai | 74/475 |
| 5,682,794 A * | 11/1997 | Shibata | 74/142 |
| 5,758,546 A * | 6/1998 | Taomo et al. | 74/488 |
| 5,862,709 A * | 1/1999 | Kageyama | 74/489 |
| 5,900,705 A | 5/1999 | Kimura | 318/286 |
| 5,904,069 A | 5/1999 | Rau et al. | 74/473.14 |
| 6,155,132 A * | 12/2000 | Yamane | 74/489 |

FOREIGN PATENT DOCUMENTS

| | | |
|---|---|---|
| EP | 2135028 A | 8/1984 |
| FR | 2644422 A1 | 9/1990 |
| JP | 53-126649 | 11/1979 |
| JP | 58-224879 | 12/1993 |
| WO | 92/19488 | 11/1992 |

* cited by examiner

Primary Examiner—Chong H. Kim
(74) Attorney, Agent, or Firm—James A. Deland

(57) ABSTRACT

A bicycle shift control device includes a takeup element for pulling and releasing a shift control element, a first finger contact member, a second finger contact member, and an interconnecting member that rotates around a rotational axis. The interconnecting member interconnects the first finger contact member and the second finger contacting member so that the first finger contact member and the second finger contact member move in a same direction relative to the rotational axis. The first finger contact member has a first finger contact surface disposed on a first side of a plane, wherein the first finger contact member moves toward the plane when the takeup element moves in a pulling direction. Conversely, the first finger contact member moves away from the plane when the takeup element moves in a releasing direction. A second finger contact member has a second finger contact surface disposed on the first side of the plane, wherein the second finger contact member moves away from the plane when the takeup element moves in the pulling direction. Conversely, the second finger contact member moves toward the plane when the takeup element moves in the releasing direction. A first straight phantom line perpendicular to the first finger contact surface intersects a second straight phantom line perpendicular to the second finger contact surface.

20 Claims, 15 Drawing Sheets

SWITCH STYLE BICYCLE SHIFT CONTROL DEVICE

CROSS REFERENCE TO RELATED APPLICATIONS

This application is a division of copending application Ser. No. 09/519,014, filed Mar. 3, 2000.

BACKGROUND OF THE INVENTION

The present invention is directed to control devices for bicycle transmissions and, more particularly, to a shift control device that operates in the nature of a switch.

Bicycle transmission shift control devices have many different forms. A simple transmission shift control device includes a rotatable lever extending from a wire winding drum such that rotation of the lever rotates the wire winding drum to pull and release a shift control wire. Sometimes a detent mechanism is incorporated into the shift control device so that the lever may be set in a plurality of predetermined positions to set the position of the shift control wire accordingly. More complicated lever-type shift control devices include multiple levers and ratchet mechanisms disposed between the levers and the wire winding drum such that rotation of one lever causes the wire to wind around the wire winding drum, and rotation of another lever causes the wire to unwind from the wire winding drum. Another type of shift control device includes an annular ring or sleeve that rotates around the bicycle handlebar. The ring or sleeve is directly or indirectly coupled to the shift control wire such that rotation of the ring or sleeve pulls and releases the shift control wire.

In all of the above types of shift control devices, either the shift control device has a complicated structure, thus increasing the manufacturing cost and risk of malfunction of the device, or else the user must grab the lever or ring with at least the thumb and forefinger, sometimes accompanied with substantial movement of the hand, thus increasing the effort to operate the shift control device. Thus, there is a need for a shift control device that has a simple structure and can be operated with minimal effort.

SUMMARY OF THE INVENTION

The present invention is directed to a bicycle transmission shift control device that has a simple structure and can be operated with minimal effort. In one embodiment of the present invention, a bicycle shift control device includes a takeup element for pulling and releasing a shift control element, a first finger contact member, a second finger contact member, and an interconnecting member that rotates around a rotational axis. The interconnecting member interconnects the first finger contact member and the second finger contacting member so that the first finger contact member and the second finger contact member move in a same direction relative to the rotational axis. The first finger contact member has a first finger contact surface disposed on a first side of a plane, wherein the first finger contact member moves toward the plane when the takeup element moves in a pulling direction. Conversely, the first finger contact member moves away from the plane when the takeup element moves in a releasing direction. A second finger contact member has a second finger contact surface disposed on the first side of the plane, wherein the second finger contact member moves away from the plane when the takeup element moves in the pulling direction. Conversely, the second finger contact member moves toward the plane when the takeup element moves in the releasing direction. A first straight phantom line perpendicular to the first finger contact surface intersects a second straight phantom line perpendicular to the second finger contact surface.

In another embodiment of the present invention, a bicycle shift control device includes a takeup element for pulling and releasing a shift control element, a first finger contact member and a second finger contact member. As with the first embodiment, the first finger contact member has a first finger contact surface disposed on a first side of a plane, wherein the first finger contact member moves toward the plane when the takeup element moves in a pulling direction. Conversely, the first finger contact member moves away from the plane when the takeup element moves in a releasing direction. The second finger contact member has a second finger contact surface disposed on the first side of the plane, wherein the second finger contact member moves away from the plane when the takeup element moves in the pulling direction. Conversely, the second finger contact member moves toward the plane when the takeup element moves in the releasing direction. A first straight phantom line perpendicular to the first finger contact surface is substantially parallel to a second straight phantom line perpendicular to the second finger contact surface, wherein the first finger contact member moves along the first phantom line and the second finger contact member moves along the second phantom line.

In another embodiment of the present invention, a bicycle shift control device includes a takeup element for pulling and releasing a shift control element, a first finger contact member, a second finger contact member, and an interconnecting member that rotates around a rotational axis. As with the above embodiments, the first finger contact member has a first finger contact surface disposed on a first side of a plane, wherein the first finger contact member moves toward the plane when the takeup element moves in a pulling direction. Conversely, the first finger contact member moves away from the plane when the takeup element moves in a releasing direction. The second finger contact member has a second finger contact surface disposed on the first side of the plane, wherein the second finger contact member moves away from the plane when the takeup element moves in the pulling direction. Conversely, the second finger contact member moves toward the plane when the takeup element moves in the releasing direction. In this case, the first finger contact surface is disposed on a first side of the rotational axis, the second finger contact surface is disposed on a second side of the rotational axis, and the takeup element is unbiased when the takeup element is disconnected from the shift control element.

In another embodiment of the present invention, a bicycle shift control device includes a takeup element for pulling and releasing a shift control element, a first finger contact member, a second finger contact member, and an interconnecting member that rotates around a rotational axis. As with the above embodiments, the first finger contact member has a first finger contact surface disposed on a first side of a plane, wherein the first finger contact member moves toward the plane when the takeup element moves in a pulling direction. Conversely, the first finger contact member moves away from the plane when the takeup element moves in a releasing direction. The second finger contact member has a second finger contact surface disposed on the first side of the plane, wherein the second finger contact member moves away from the plane when the takeup element moves in the pulling direction. Conversely, the second finger contact member moves toward the plane when the takeup element moves in the releasing direction. In this case, the first finger contact surface is disposed on a first side of the rotational axis, the second finger contact surface is disposed on a second side of the rotational axis, and a detent mechanism is maintains the takeup element in only two positions. A first of the two positions is a cable pulled position, and a second of the two positions is a cable released position.

In still another embodiment of the present invention, a bicycle shift control device includes a takeup element for pulling and releasing a shift control element, only one finger contact lever for moving the takeup element, and a detent mechanism for maintaining the takeup element in only two positions. A first of the two positions is a cable pulled position, and a second of the two positions is a cable released position.

In another embodiment of the present invention, a bicycle shift control device includes a base member, a rotatable dial coupled to the base member for rotation around a rotational axis, a finger contact projection extending from the rotatable dial in a direction of the rotational axis, and a shift element coupler disposed with the rotatable dial.

In yet another embodiment of the present invention, a bicycle shift control device includes a base member having a base member axis and a rotatable member coupled to the base member coaxial with the base member axis, wherein the rotatable member rotates relative to the base member around the base member axis. A cam surface is disposed on at least one of the base member and the rotatable member so that the rotatable member moves in a direction of the base member axis when the rotatable member rotates relative to the base member. A finger contact projection extends from the rotatable member in a direction radially outwardly from the base member axis, and a shift element coupler is disposed with the rotatable member so that the shift element coupler moves in the direction of the base member axis when the rotatable member rotates relative to the base member.

DETAILED DESCRIPTION OF THE EMBODIMENTS

Figure 1:
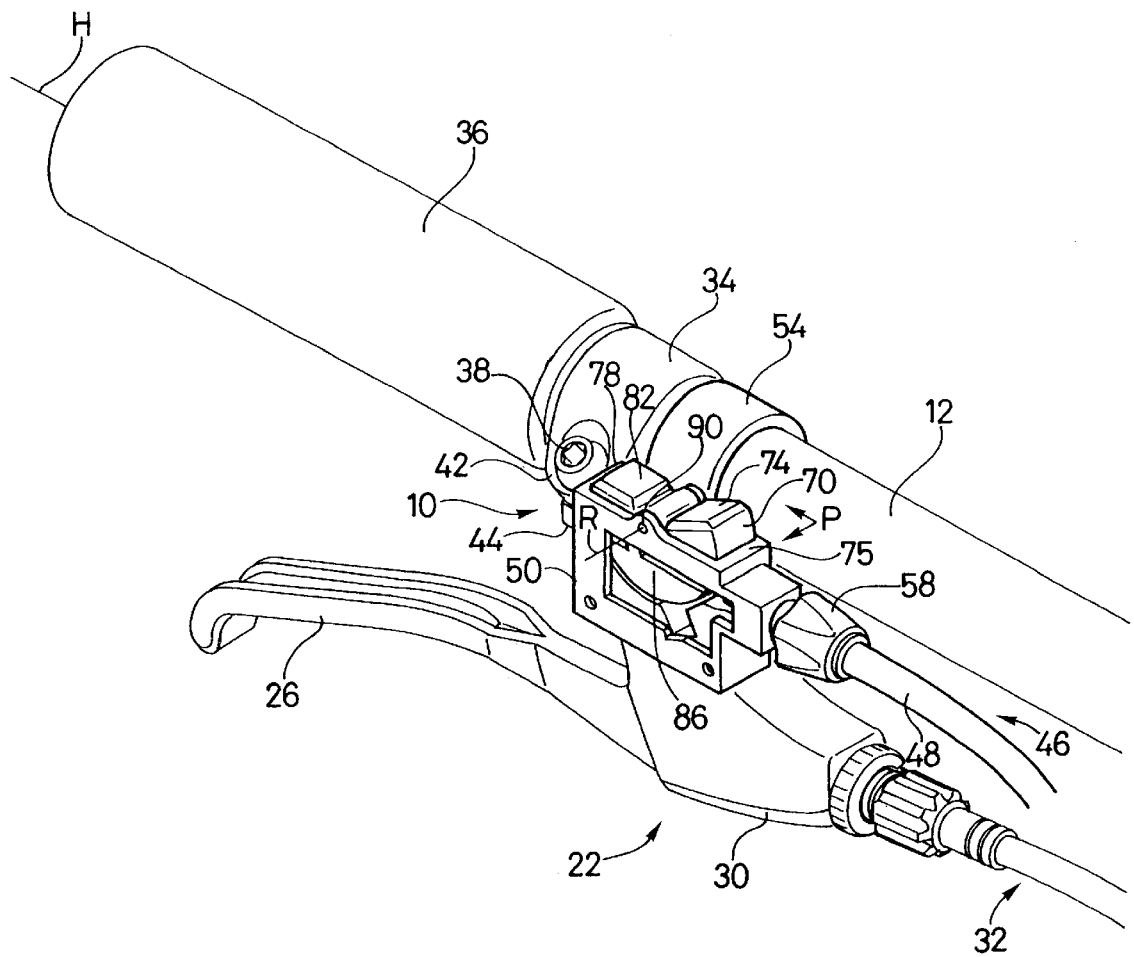
FIG. 1 is an oblique view of a first embodiment of a shift control device according to the present invention.
Figure 2:
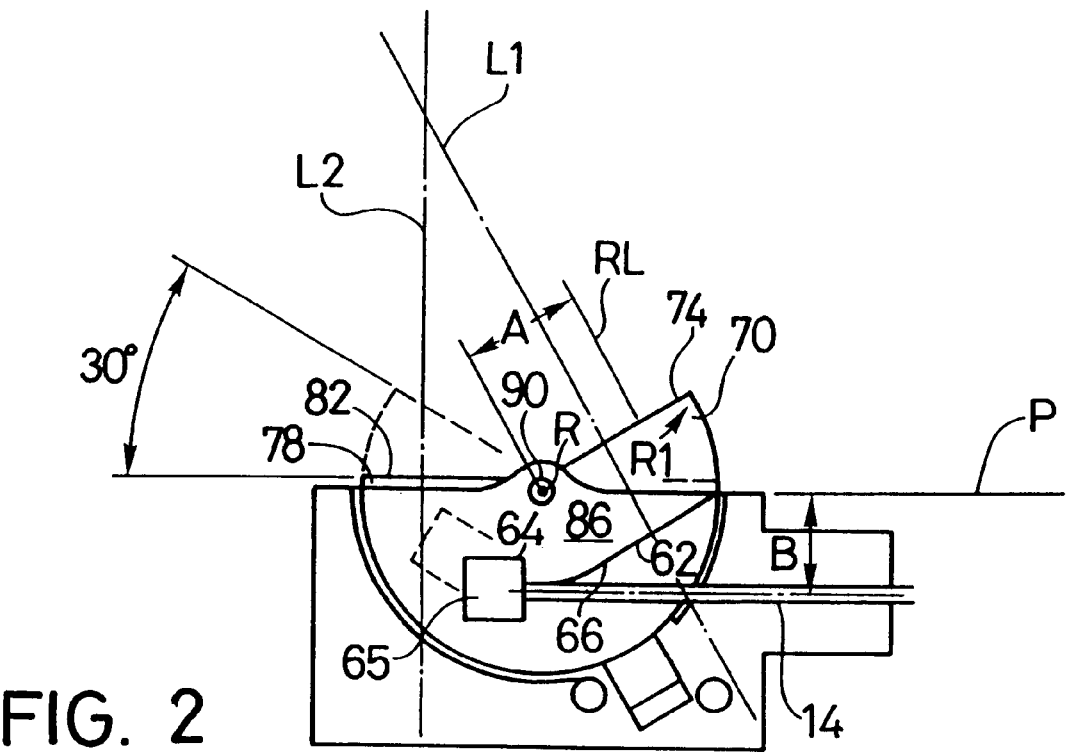
FIG. 2 is a cut away view showing how a control cable is connected to the shift control device.
Figure 3:
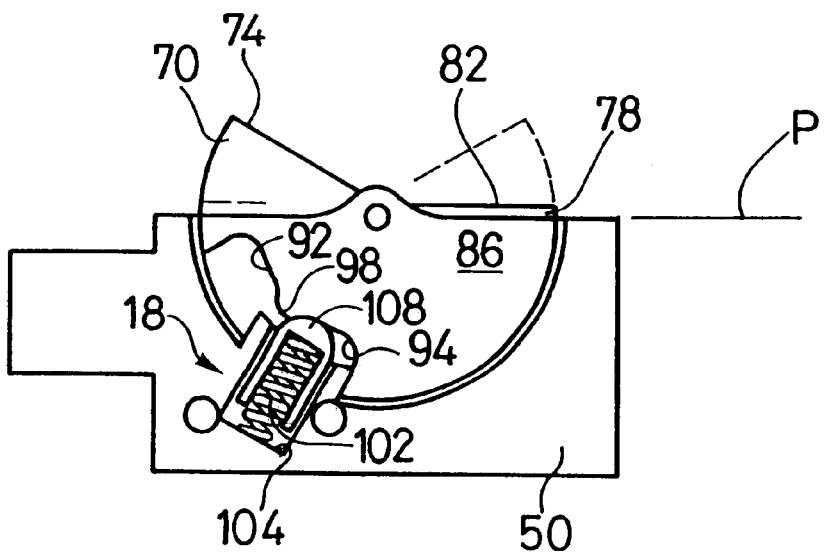
FIG. 3 is a cut away view showing a detent mechanism for the shift control device.

FIG. 1 is an oblique view of a first embodiment of a shift control device 10 according to the present invention mounted to a bicycle handlebar 12; FIG. 2 is a cut away view showing how an inner wire 14 of a Bowden-type control cable 46 is connected to shift control device 10, and FIG. 3 is a cut away view showing a detent mechanism 18 for shift control device 10. As shown in FIGS. 1–3, shift control device 10 is mounted adjacent to a brake control device 22 having a brake control lever 26 pivotably connected to a brake control device housing 30 for operating a Bowden-type brake control cable 32 in a well known manner. Brake control device housing 30 includes an attachment band 34 that substantially encircles handlebar 12 for mounting brake control device 22 to handlebar 12 inward of a grip portion 36 of handlebar 12. More specifically, a mounting bolt 38 extends through an opening (not shown) in a mounting ear 42 and screws into a threaded opening (not shown) in an opposed mounting ear 46 for drawing mounting ears 42 and 44 toward each other to tighten attachment band 34 around handlebar 12. Attachment band 34 extends along a handlebar axis H, wherein handlebar axis H is centered within attachment band 34.

In this embodiment, shift control device 10 is used to operate a Bowden-type control cable 46 wherein a shift control element such as inner wire 14 slides within an outer casing 48. Shift control device 10 includes a generally rectangular housing 50 that is attached to handlebar 12 though an attachment band 54 that has the same structure as attachment band 34 (i.e., two mounting ears tightened by a mounting bolt, not shown). A conventional cable adjusting barrel 58 screws into the side of housing 50 and terminates outer casing 48 of control cable 46 in a well known manner. A takeup element 62 (FIG. 2) having a cable coupling bore 64 and a winding surface 66 is disposed in housing 50. Cable coupling bore 64 engages a conventional cable end bead 65 of inner wire 14 for pulling and releasing inner wire 14. Inner wire 14 slightly winds and unwinds around winding surface 66 during the pulling and releasing operations. A first finger contact member 70 having a first finger contact surface 74 is disposed above and faces away from a plane P which, in this embodiment, contains an upper surface 75 of housing 50. A second finger contact member 78 having a second finger contact surface 82 also is disposed above and faces away from plane P. Of course, the plane P need not contain the upper surface 75 of housing 50, and first finger contact surface 74 and second finger contact surface 82 need not face away from plane P.

An interconnecting member 86 is pivotably connected to housing 50 through a pivot shaft 90 so that interconnecting member 86 rotates around a rotational axis R that extends in a direction substantially perpendicular to attachment band 54 and handlebar axis H. As shown more clearly in FIG. 2, interconnecting member 86 interconnects first finger contact member 70, second finger contacting member 78 and takeup element 62 so that first finger contact member 70 and second finger contact member 78 are located on opposite sides of rotational axis R and move (i.e, pivot) in a same direction relative to rotational axis R. As a result, first finger contact member 70 moves toward plane P (from the position indicated in solid lines in FIG. 2 to the position shown in broken lines in FIG. 2) when takeup element 62 moves in a wire pulling direction, and first finger contact member 70 moves away from plane P when takeup element 62 moves in a wire releasing direction. Similarly, second finger contact member 78 moves away from plane P when takeup element 62 moves in the wire pulling direction, and second finger contact member 82 moves toward plane P when takeup element 62 moves in the wire releasing direction. To facilitate this operation, first finger contact member 70, second finger contact member 78, takeup element 62 and interconnecting member 65 in this embodiment are formed as one piece or at least integrally coupled together.

In this embodiment, first finger contact surface 74 is inclined relative to second finger contact surface 82 such that a first straight phantom line LI extending upwardly and perpendicularly away first finger contact surface 74 intersects a second straight phantom line L2 extending upwardly and perpendicularly away from second finger contact surface 82, regardless of the position in which shift control device 10 is viewed. The resulting structure operates like a rocker switch. While such a phantom line is readily determined from the flat finger contact surfaces 74 and 82 in this embodiment, such phantom lines also can be determined easily from embodiments with no flat finger contact surfaces by drawing the phantom line perpendicular to a line that is tangent to the finger contact surface at the point of contact between the phantom line and the finger contact surface. Also, in other embodiments the intersection of the phantom lines could be located downwardly away from the finger contact surfaces.

FIG. 3 is a cut away view showing detent mechanism 18 for shift control device 10. In this embodiment, detent mechanism 18 maintains takeup element 62 in only two positions: the cable pulled position shown by broken lines in FIG. 2 and the cable released position shown by solid lines in FIG. 2. Detent mechanism 18 includes a first recess 92, a second recess 94 and a detent projection 98 formed on interconnecting member 86. A spring 102 is disposed in a recess 104 in housing 50 for pressing a detent member 108 against interconnecting member 86. Thus, takeup element 62 will be maintained in the cable pulled position when detent member 108 is disposed in first recess 92, and takeup element 62 will be maintained in the cable released position when detent member 108 is disposed in second recess 94. Unlike many prior art shift control devices, no biasing mechanism is provided to bias takeup element 62, first finger contact member 70 or second finger contact member 78 toward any particular position. Thus, when shift control device 10 is not connected to inner wire 14, takeup element 62, first finger contact member 70 and second finger contact member 78 are free to float in the range determined by the circumferential width of first recess 92 and second recess 94.

As another feature of the present invention, we define a lever ratio LR=A/B, wherein A is the distance between the rotational axis R and a reference line RL perpendicular to first finger contact surface 74, the distance being measured perpendicular to reference line RL, and B is the distance between the rotational axis R and the inner wire 14. The location of RL is determined by adding 5 millimeters to the radius of curvature R1 (in millimeters) of the edge of first finger contact member 70. In this embodiment, R1 is one millimeter, so RL is located 6 millimeters from the edge of first finger contact member 70. Preferably, 0.8<LR<2.

Figure 4:
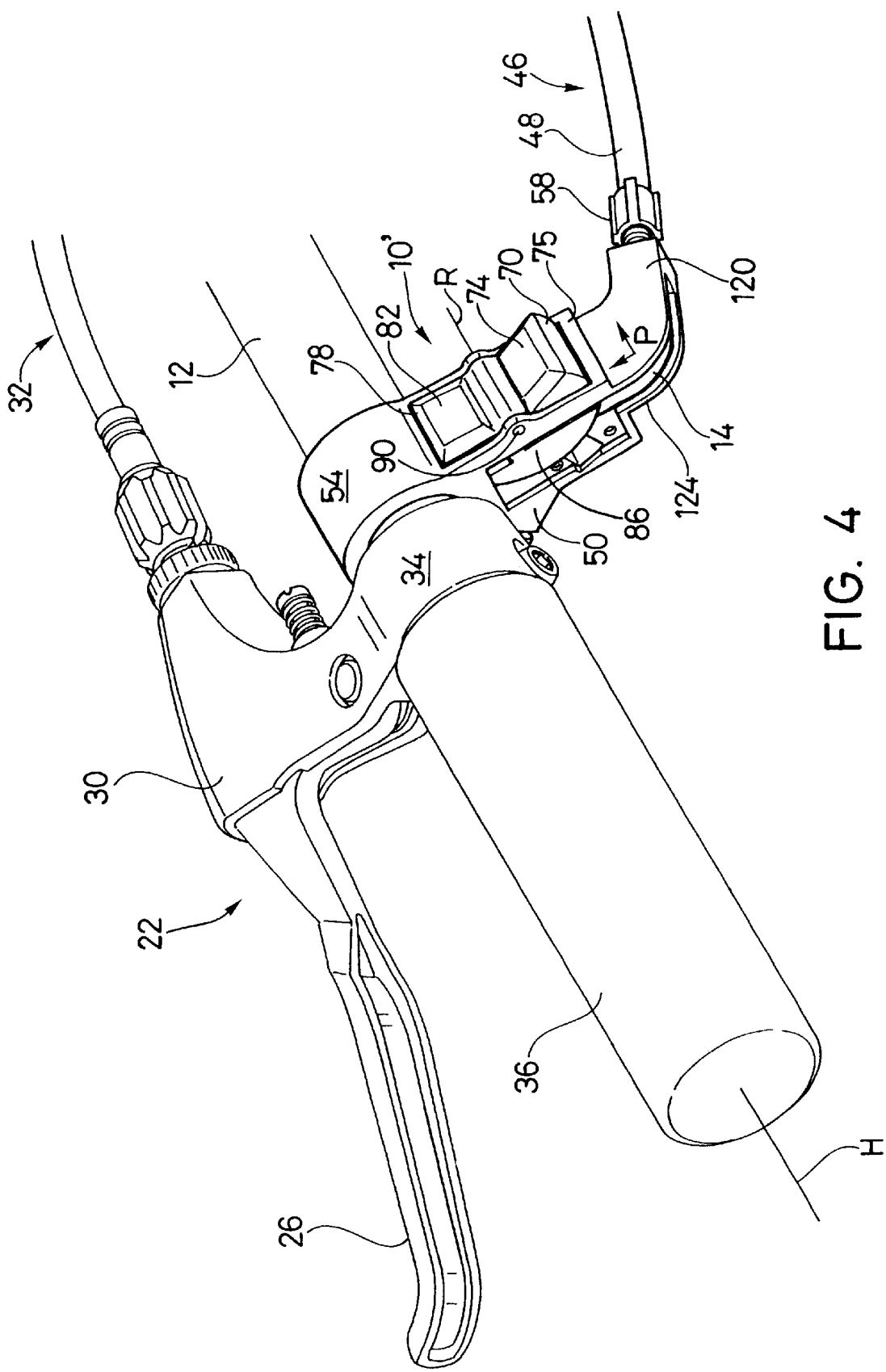
FIG. 4 is an oblique view of a second embodiment of a shift control device according to the present invention.

FIG. 4 is an oblique view of a shift control device 10' which represents a second embodiment of the present invention. This embodiment is constructed the same as shift control device 10 shown in FIGS. 1–3 except where shown or noted. Accordingly, the same components are numbered the same.

This shift control device 10' differs from shift control device 10 in that housing 50 extends radially outward from attachment band 54 and handlebar axis H, and rotational axis R is substantially parallel to handlebar axis H. Also, housing 50 includes a wire guide portion 120 with a cable guide surface 124 for changing the direction of inner wire 14 so that control cable 46 can extend substantially parallel to handlebar 12 in a well known manner.

Figure 5:
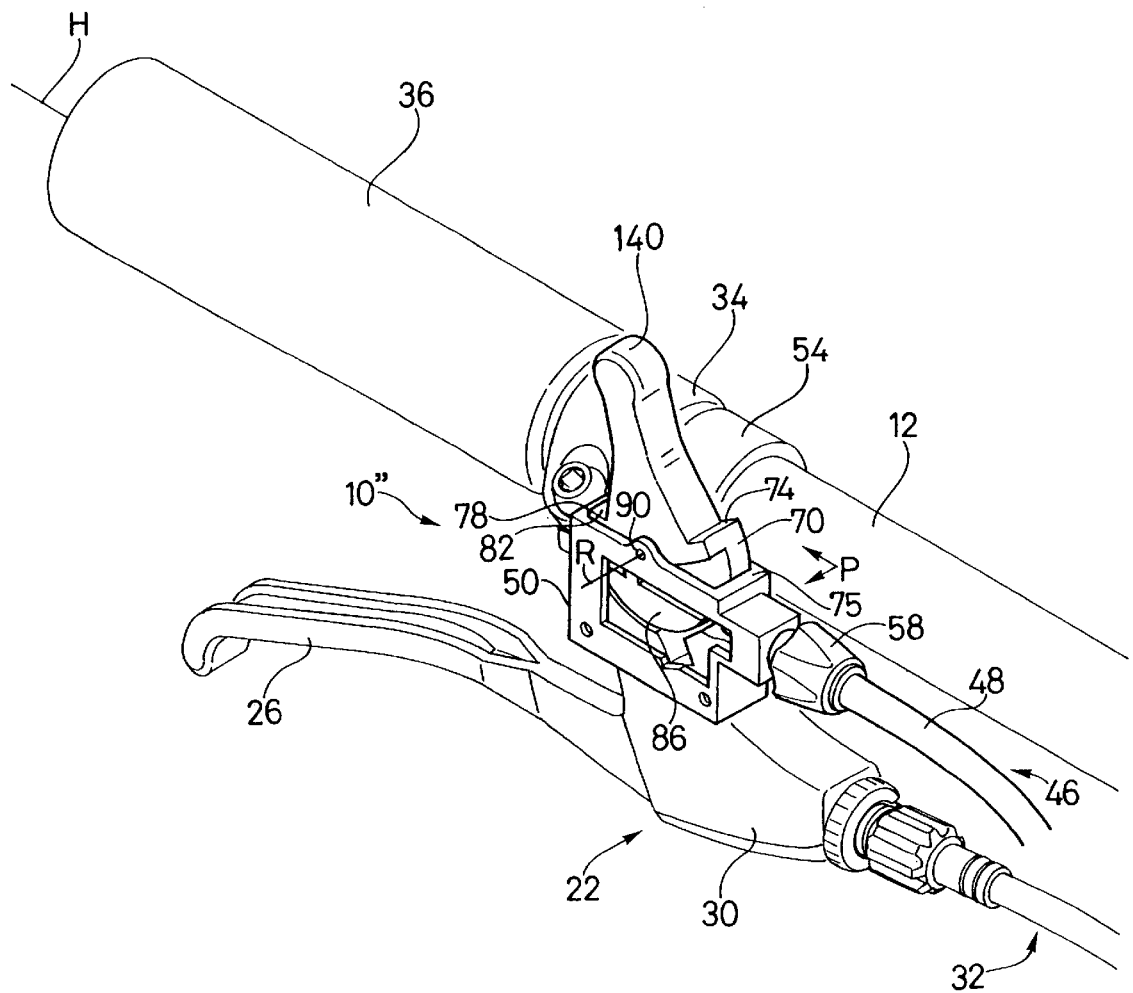
FIG. 5 is an oblique view of a third embodiment of a shift control device according to the present invention.

FIG. 5 is an oblique view of a shift, control device 10" which represents a third embodiment of the present invention. This embodiment is constructed the same as shift control device 10 shown in FIGS. 1–3 except where shown or noted. Accordingly, the same components are numbered the same.

This shift control device 10" differs from shift control device 10 in that a lever 140 that is integrally formed as one piece with interconnecting member 86, first finger contact member 70 and second finger contact member 78 extends outwardly from plane P between first finger contact surface 74 and second finger contact surface 82. Thus, shift control device 10" can operate like a rocker switch by pressing first finger contact surface 74 or second finger contact surface 82. Alternatively, shift control device 10" can operate like a toggle switch by moving lever 140.

Figure 6:
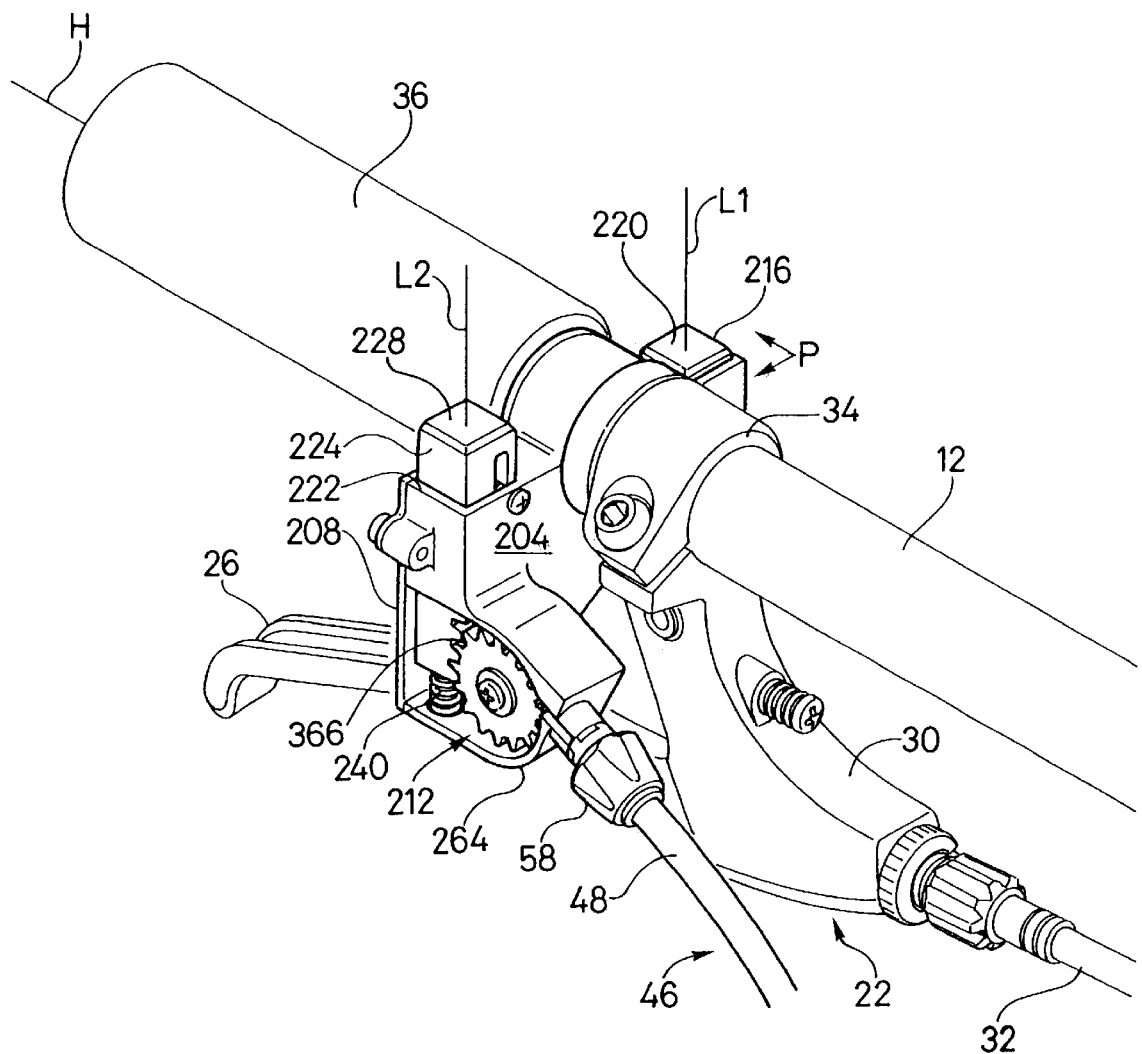
FIG. 6 is an oblique view of a fourth embodiment of a shift control device according to the present invention.
Figure 7:
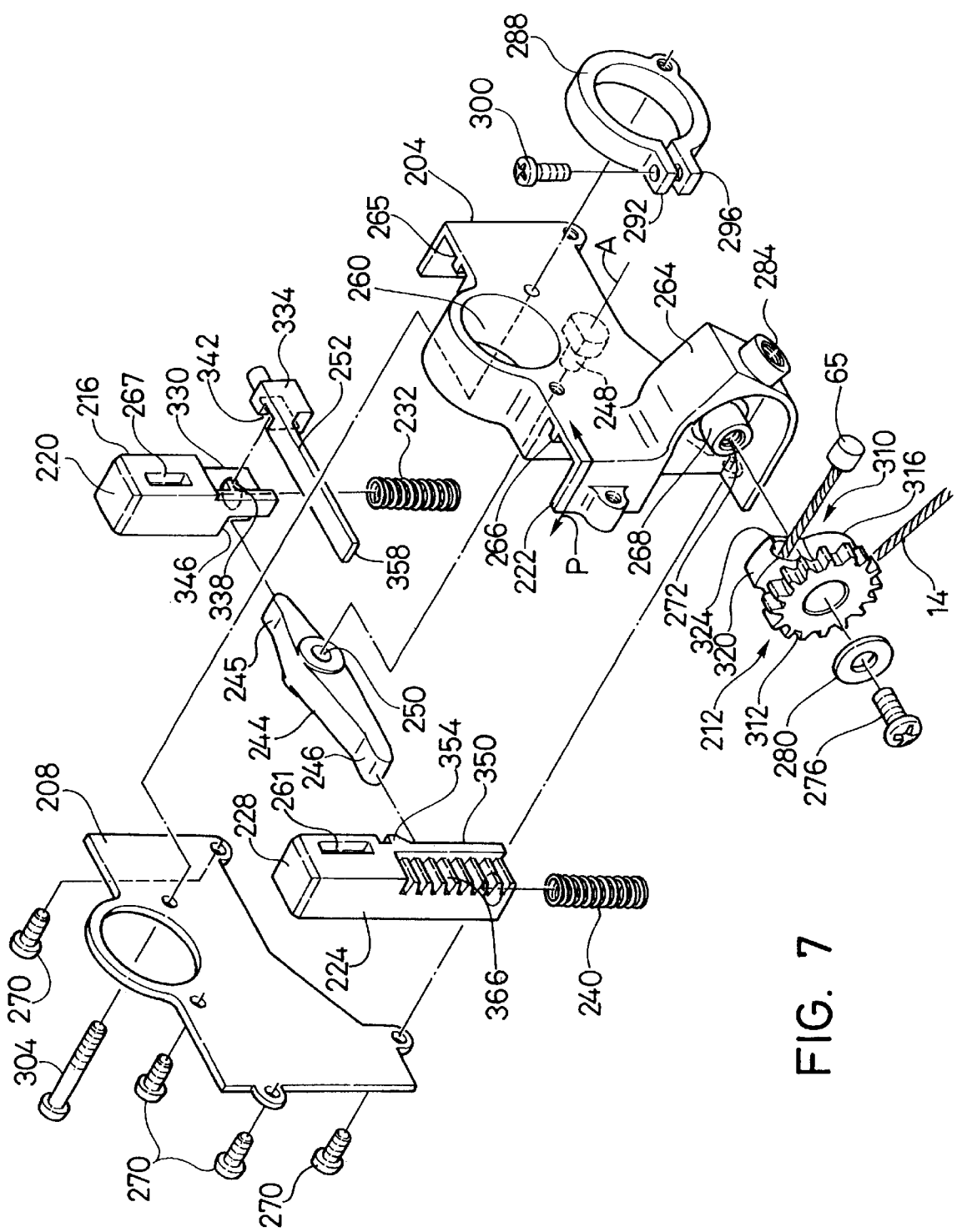
FIG. 7 is an exploded view of the shift control device shown in FIG. 6.
Figure 8:
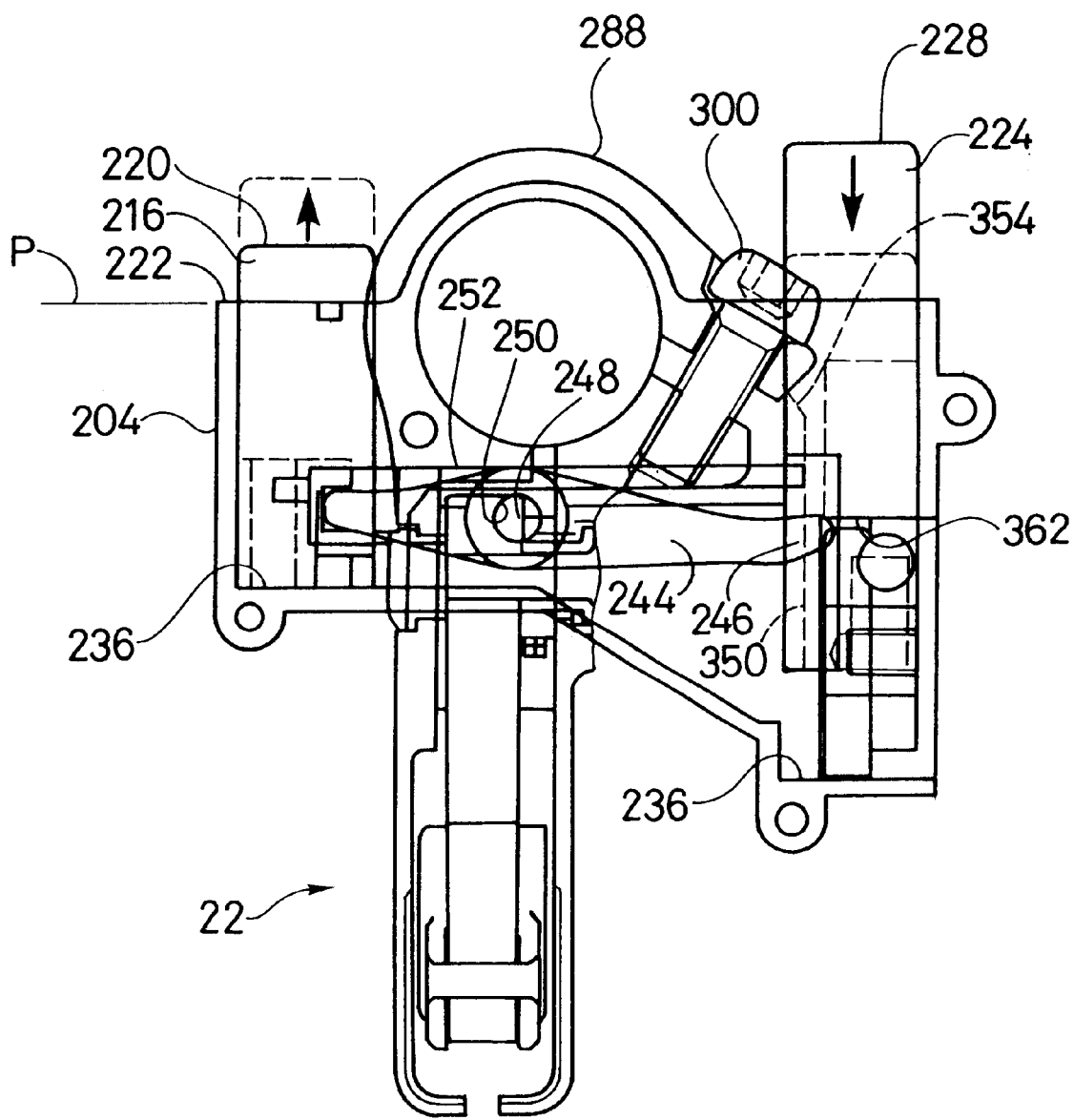
FIG. 8 is a cut away view of the shift control device shown in FIG. 6.

FIG. 6 is an oblique view of a shift control device 200 which represent a fourth embodiment of the present invention, FIG. 7 is an exploded view of shift control device 200, and FIG. 8 is a cut away view of shift control device 200. As shown in FIGS. 6–8. shift control device 200 includes a base member or housing 204, a housing cover 208, a takeup element 212 for pulling and releasing a shift control element such as inner wire 14 of control cable 46, a first finger contact member 216 having a first finger contact surface 220 disposed on a first side of a plane P and facing away from plane P (which may include an upper surface 222 of housing 204), a second finger contact member 224 having a second finger contact surface 228 disposed on the first side of plane P and facing away from plane P, a first spring 232 disposed between a bottom floor 236 (FIG. 8) of housing 204 and first finger contact member 216 for biasing first finger contact member 216 upwardly, a second spring 240 disposed between bottom floor 236 and second finger contact member 224 for biasing second finger contact member 224 upwardly, an interconnecting member in the form of an interconnecting lever 244 having a first end 245 and a second end 246 connected between first finger contact member 216 and second finger contact member 224, and a pawl 252 which functions as a detent mechanism interconnected between first finger contact member 216 and second finger contact member 224. Interconnecting lever 244 rotates around a pivot axis A defined by a pivot shaft 248 inserted in an opening 250 located between first end 245 and second end 246 and for communicating forces applied to one of first finger contact member 216 and second finger contact member 224 to the other one of the first finger contact member 216 and second finger contact member 224.

Housing 204 includes a circular opening 260 for receiving handlebar 12 therethrough, a takeup element mounting boss 264, a first guide projection 265 and a second guide projection 266. Takeup element mounting boss 264 includes a takeup element mounting shaft 268 having a threaded opening 272 for rotatably mounting takeup element 212 thereto using a screw 276 and washer 280. Takeup element mounting boss 264 also includes a threaded opening 284 for threadingly engaging cable adjusting barrel 58 which terminates outer casing 48 of control cable 46. First guide projection 265 slidingly mates with a guide slot 267 in first finger contact member 216 for stably guiding first finger contact member 216 when first finger contact member 216 moves relative to housing 204 as described more fully below. Similarly, second guide projection 266 slidingly mates with a guide slot 269 in second finger contact member 224 for stably guiding second finger contact member 224 when second finger contact member 224 moves relative to housing 204. Housing cover 208 is mounted to housing 204 using screws 270. The entire assembly is attached to handlebar 12 by an annular clamping ring 288 having mounting ears 292 and 296 and a screw 300 similar to the above embodiments. Clamping ring 298 is attached to housing 204 by a mounting screw 304.

Takeup element 212 includes a wire winding drum 310 and a drive gear 312 coaxially mounted with wire winding drum 310. Wire winding drum 310 includes a wire winding surface 316 and a cable coupling projection 320 with a cable coupling bore 324 for receiving cable end bead 65 therein.

First finger contact member 216 includes a pawl mounting recess 330 for receiving a head 334 of pawl 252 therein and a pawl mounting projection 338 for engaging a complementary groove 342 in head 334 of pawl 252. First finger contact member 216 also includes a lever coupling abutment 346 for contacting first end 245 of interconnecting lever 244. Second finger contact member 224 includes a pawl receiving recess 350 having a detent projection 354 for engaging a second end 358 of pawl 252, a lever coupling abutment 362 (FIG. 8) for contacting second end 246 of interconnecting lever 244, and a gear rack 366 for engaging gear 312 of takeup element 212.

As a result of the see-saw movement of interconnecting lever 244, first finger contact member 216 moves toward plane P when takeup element 212 moves in a pulling direction, and first finger contact member 216 moves away from plane P when takeup element 212 moves in a releasing direction. Conversely, second finger contact member 224 moves away from plane P when takeup element 212 moves in the pulling direction, and second finger contact member 224 moves toward plane P when takeup element 212 moves in the releasing direction. A first straight phantom line L1 perpendicular to first finger contact surface 220 is substantially parallel to a second straight phantom line L2 perpendicular to second finger contact surface 228, wherein first finger contact member 216 moves along first phantom line L1 and second finger contact member 224 moves along second phantom line L2. As with the above embodiments, such phantom lines also can be determined easily from embodiments with no flat finger contact surfaces by drawing the phantom line perpendicular to a line that is tangent to the finger contact surface at the point of contact between the phantom line and the finger contact surface. To vary the mechanical advantage of first finger contact member 216 and second finger contact member 224 in this embodiment, pivot axis A is located closer to first end 245 of interconnecting lever 244 than second end 246 of interconnecting lever 244. Of course, pivot axis A could be located closer to second end 246 of interconnecting lever 244 than first end 245 of interconnecting lever 244, or pivot axis A could be located in the center of interconnecting lever 244, depending upon the requirements for a particular application.

As with the above embodiments, shift control device 200 sets takeup element 212 in one of two positions, a cable pulled position (shown in solid lines in FIG. 8) wherein first finger contact surface 220 is located close to plane P, second finger contact surface 228 is located remote from plane P, and second end 358 of pawl 252 is located in the portion of recess 350 below detent projection 354; and a cable released position (shown in broken lines in FIG. 8) wherein second finger contact surface 228 is located close to plane P, first finger contact surface 220 is located remote from plane P, and second end of pawl 252 is located in the portion of recess 350 above detent projection 354.

Figure 9:
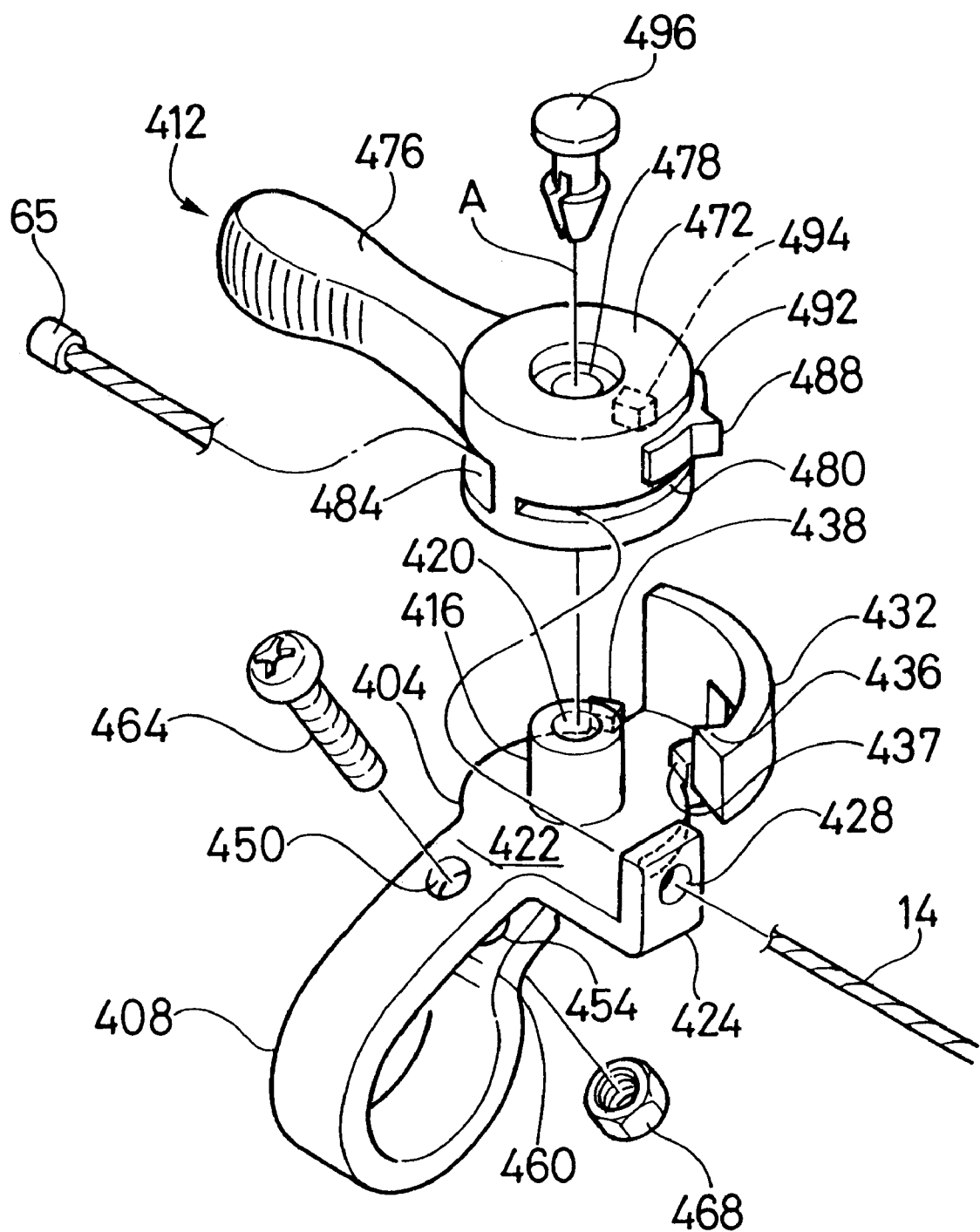
FIG. 9 is an exploded view of a fifth embodiment of a shift control device according to the present invention.
Figure 10:
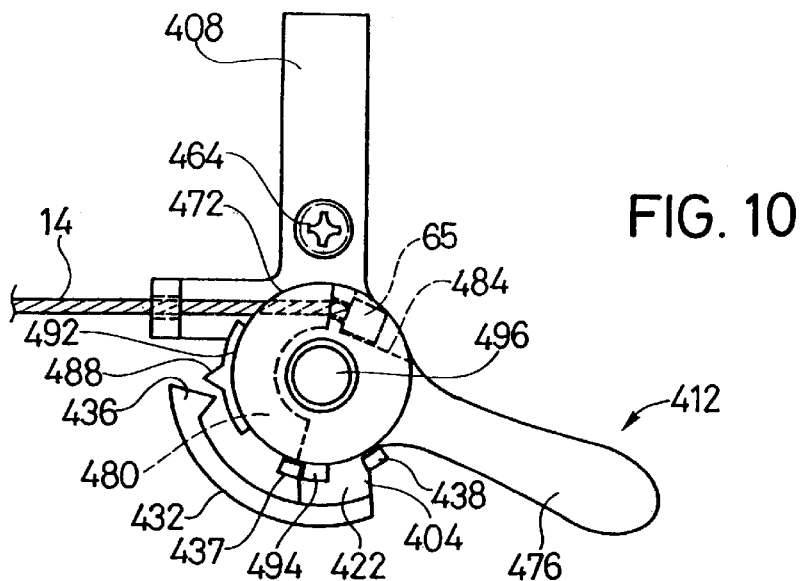
FIGS. 10–12 are top views illustrating the operation of the shift control device shown in FIG. 9.
Figure 11:
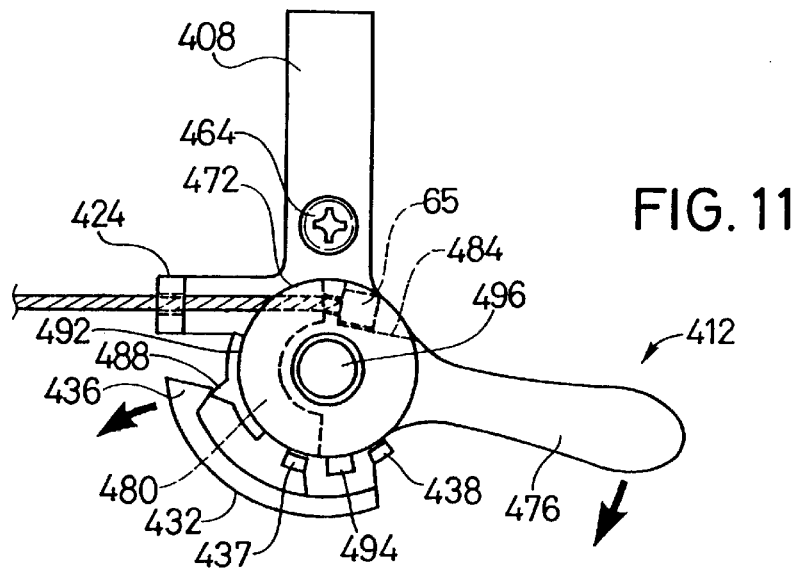
Figure 12:
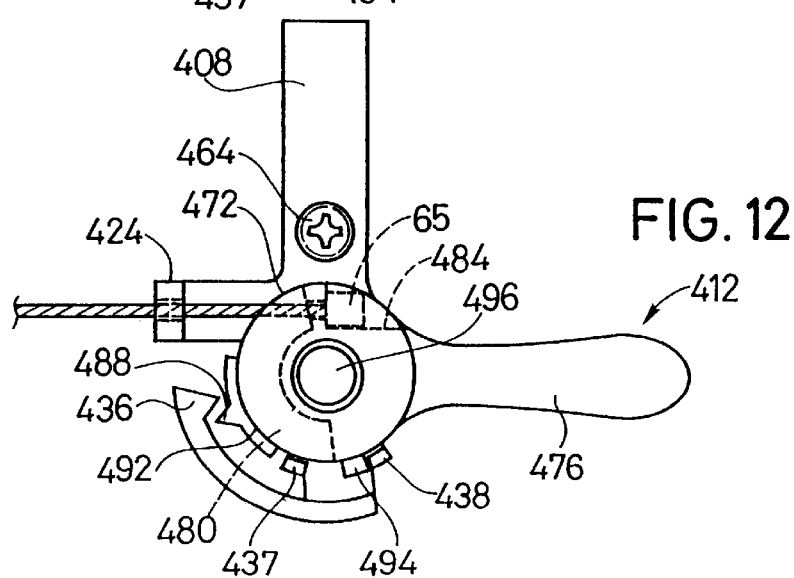

FIG. 9 is an exploded view of a shift control device 400 representing a fifth embodiment of the present invention, and FIGS. 10–12 are top views illustrating the operation of shift control device 400. As shown in FIGS. 9–12, shift control device 400 includes a base member 404, an attachment band 408 and a shift lever 412. Base member 404 includes a pivot shaft 416 extending upwardly from a floor 422 and having a central opening 420, a cable guide 424 having a cable guide opening 428 for receiving a cable 14 therethrough, a relatively resilient detent wall 432 having a generally triangular detent projection 436 extending radially inwardly toward pivot shaft 416, and limit stops 437 and 438 for limiting the range of motion of shift lever 412.

Attachment band 408 extends from base member 404 and has a substantially cylindrical shape. A mounting hole 450 aligns with a mounting hole 454 in a mounting ear 460 for receiving a mounting screw 464 therethrough. Attachment band 408 is tightened around handlebar 12 (not shown) using screw 464 and a nut 468.

Shift lever 412 includes a takeup element in the form of a wire pulling drum 472 and a lever portion 476 extending radially outwardly as one piece from wire pulling drum 472. Wire pulling drum 472 includes a central mounting opening 478 for receiving pivot shaft 416 therethrough. Thus, shift lever 412 is supported for rotation around an axis A defined by pivot shaft 416. Wire pulling drum 472 also includes a wire receiving groove 480 for receiving wire 14 therein during rotation of wire pulling drum 472, a cable coupling bore 484 for receiving cable end bead 65 of wire 14 therein, a generally triangular detent projection 488 extending radially outwardly from a side wall 492, and a motion stop 494 extending radially outwardly from side wall 492. Shift lever 412 is fastened to base member 404 by a fastener 496 extending into central opening 420 in pivot shaft 416.

As with the above embodiments, shift control device 400 sets wire pulling drum in one of two positions: a cable pulled position shown in FIG. 10 and a cable released position shown in FIG. 12. FIGS. 10–12 show the operation of shift control device 400 as shift lever 412 moves from the cable pulled position shown in FIG. 10, wherein detent projection 488 on cable pulling drum 472 is located above detent projection 436 on detent wall 432 and clockwise rotation of shift lever 412 is limited by contact between motion stop 494 on cable pulling drum 472 and limit stop 437 on base member 404, to the cable released position shown in FIG. 12, wherein detent projection 488 on cable pulling drum 472 is located below detent projection 436 on detent wall 432 and counterclockwise rotation of shift lever 412 is limited by contact between motion stop 494 on cable pulling drum 472 and limit stop 438 on base member 404. When detent projection 488 initially contacts detent projection 436 during counterclockwise rotation of shift lever 412, the angled side walls of each detent projection causes the relatively resilient detent wall 432 to move radially outwardly to allow detent projection 488 to move past detent projection 436 and assume the position shown in FIG. 12. The same occurs when shift lever portion 412 moves clockwise from the position shown in FIG. 12 to the position shown in FIG. 10.

Figure 13:
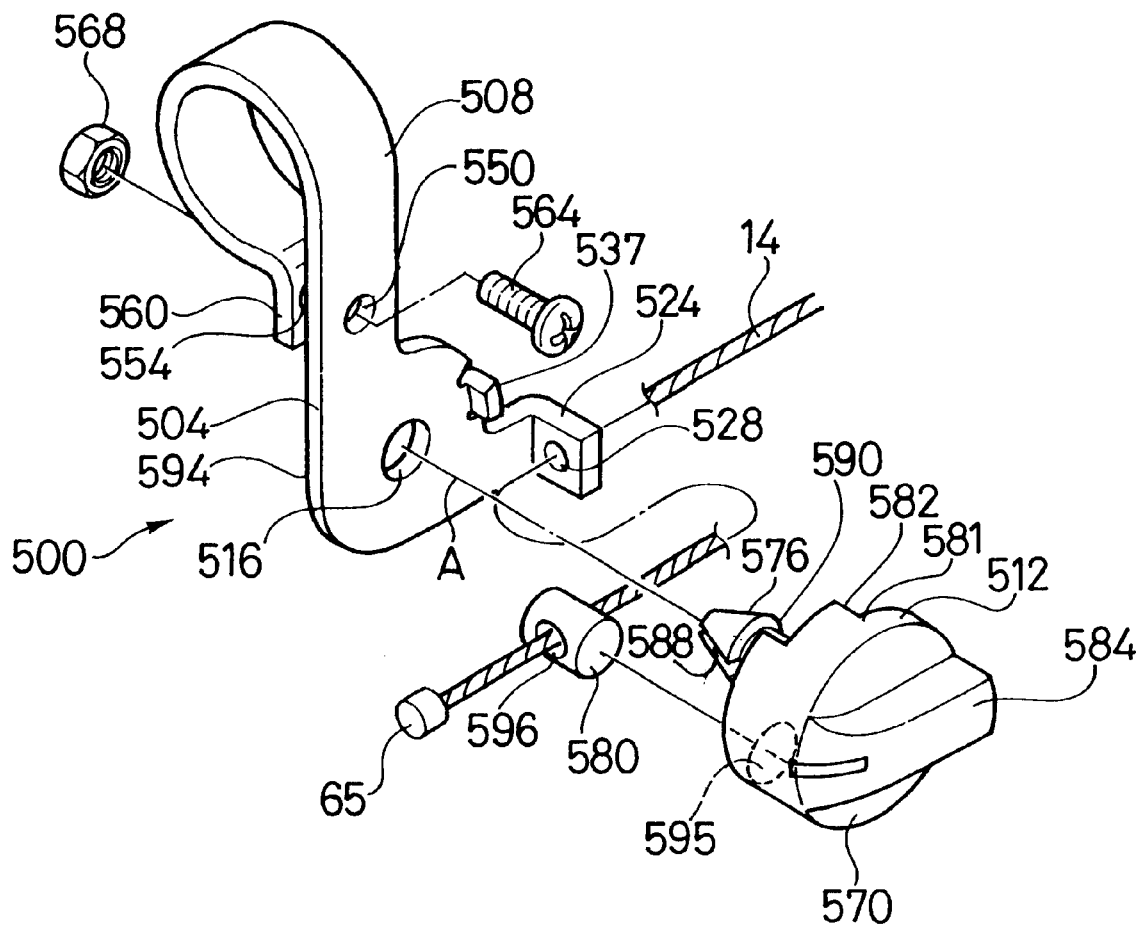
FIG. 13 is an exploded view of a sixth embodiment of a shift control device according to the present invention.
Figure 14:
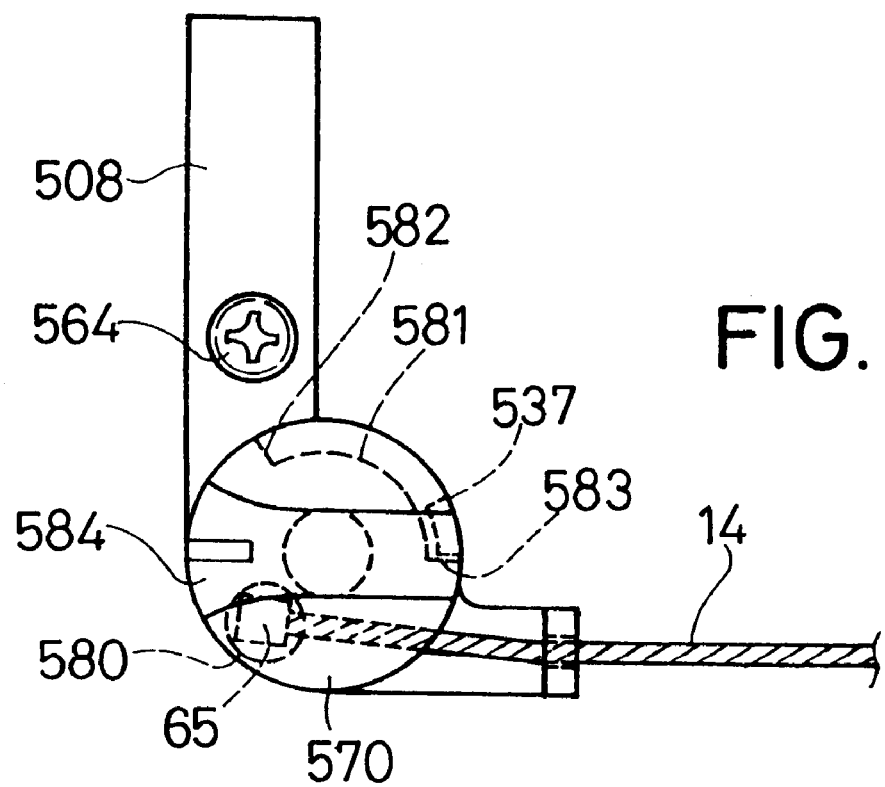
FIGS. 14 and 15 are top views illustrating the operation of the shift control device shown in FIG. 13.
Figure 15:
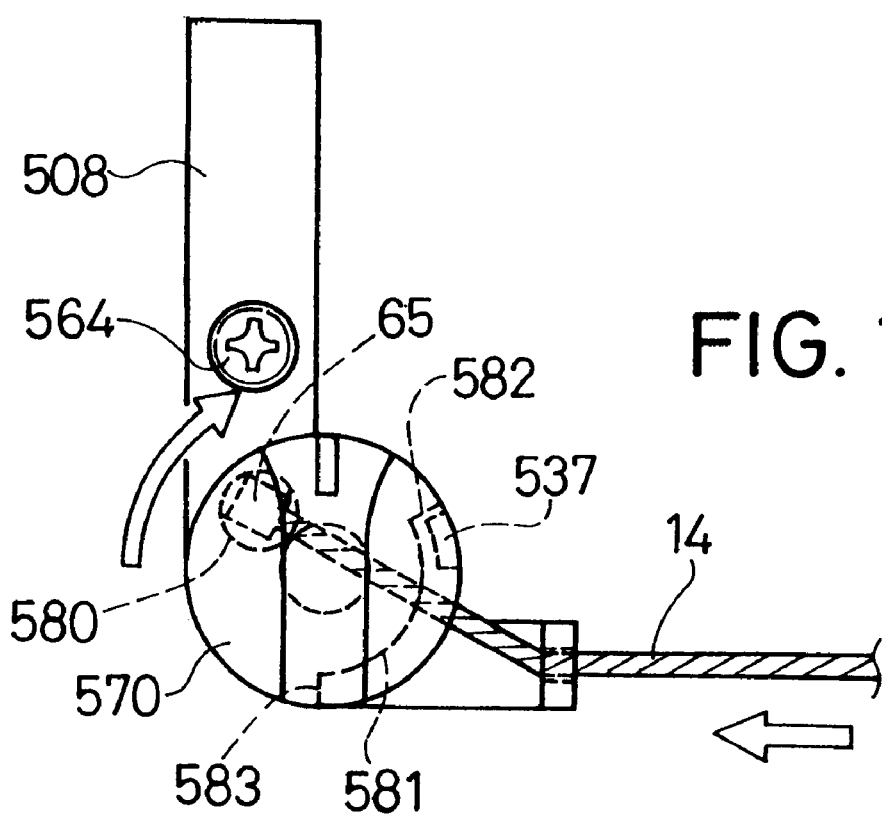

FIG. 13 is an exploded view of a shift control device 500 representing a sixth embodiment of the present invention, and FIGS. 14–15 are top views illustrating the operation of shift control device 500. Shift control device 500 includes a base member 504, an attachment band 508 and a shift dial 512. Base member 504 includes a pivot opening 516, a cable guide 524 having a cable guide opening 528 for receiving cable 14 therethrough, and a motion stop 537 for limiting the range of motion of shift dial 512.

Attachment band 508 extends from base member 504 and has a substantially cylindrical shape. A mounting hole 550 aligns with a mounting hole 554 in a mounting ear 560 for receiving a mounting screw 564 therethrough. Attachment band 508 is tightened around handlebar 12 (not shown) using screw 564 and a nut 568.

Shift dial 512 includes a substantially circular dial portion 570, a pivot shaft 576 for rotation around an axis A defined by pivot shaft 576, a shift element coupler 580, a motion limiting groove 581 extending in a circumferential direction and defining limit stops 582 and 583 (FIGS. 14–15) for receiving motion stop 537 therein, and a finger contact projection 584 extending from dial portion 570 in a direction of axis A away from base member 504. In this embodiment, finger contact projection extends diametrically across dial portion 570 in a direction generally perpendicular to rotational axis A. Pivot shaft 576 includes a slot 588 and a locking abutment 590 so that pivot shaft 576 may be compressed to allow locking abutment 590 to pass through pivot opening 516 in base member 504 so that locking abutment will abut against the lower surface 594 of base member 504 and thereby rotatably lock shift dial 512 to base member 504. Shift element coupler 580 is fitted within a coupler bore 595 in dial portion 570 and includes a cable end bead receiving opening 596 for seating cable end bead 65 of wire 14 so that wire 14 is coupled to dial portion 570.

As with the above embodiments, shift control device 500 sets shift dial 512 in one of two positions: a cable released position shown in FIG. 14, wherein counterclockwise rotation of shift dial 512 is limited by contact between motion stop 537 and limit stop 583, and a cable pulled position shown in FIG. 15, wherein clockwise rotation of shift dial 512 is limited by contact between motion stop 537 and limit stop 582. This embodiment does not have a detent mechanism, but if desired a detent mechanism similar to the one used in shift control device 400 or any other embodiment may be provided.

Figure 16:
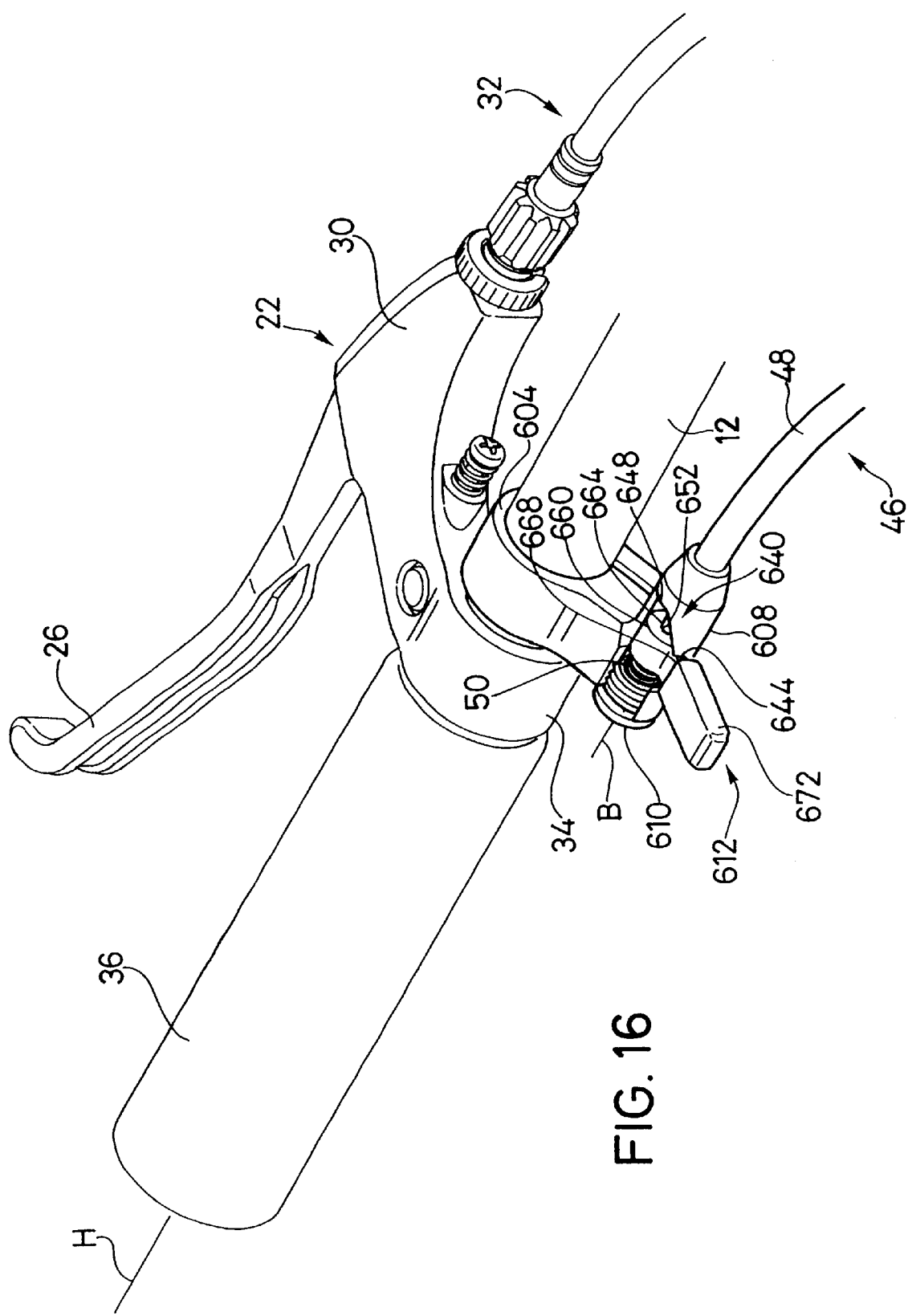
FIG. 16 is an oblique view of a seventh embodiment of a shift control device according to the present invention.
Figure 17:
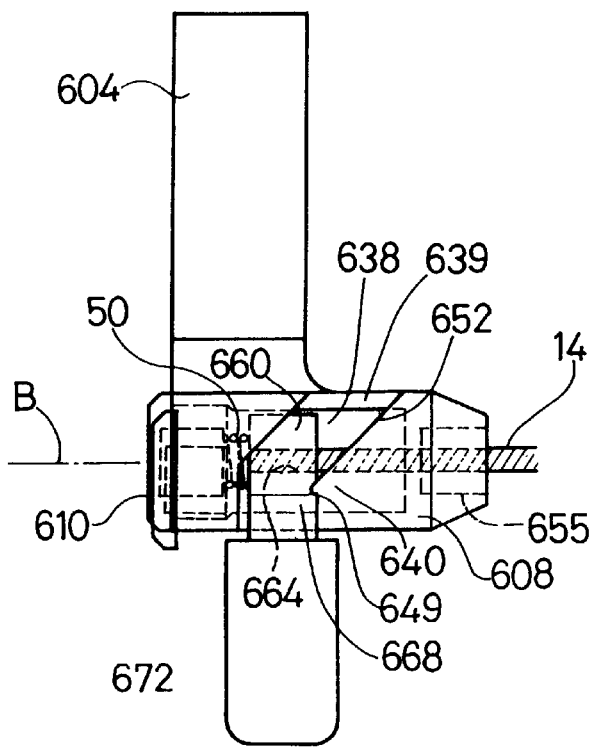
FIG. 17 is a detailed side view of the shift control device shown in FIG. 16.

FIG. 16 is an oblique view of a shift control device 600 representing a seventh embodiment of the present invention, and FIG. 17 is a detailed side view of shift control device 600. In this embodiment, shift control device 600 includes an attachment band 604 for mounting shift control device 600 to handlebar 12, a generally cylindrical base member 608 having a base member axis B, a cap screw 610 for covering an end of base member 608, and a rotatable member in the form of a finger contact lever 612 coupled to base member 608 so that finger contact lever 612 rotates relative to base member 608 around base member axis B.

As with the above embodiments, attachment band 604 extends from base member 608 and has a substantially cylindrical shape. A mounting hole 624 (FIG. 18) aligns with a mounting hole 628 in a mounting ear 632 for receiving a mounting screw 636 therein. Attachment band 604 is tightened around handlebar 12 using mounting screw 636.

Base member 608 includes a slot 638 (FIG. 17) on a side surface 639 thereof forming a cam surface 640. Cam surface 640 includes a first positioning surface 644 extending in a circumferential direction substantially perpendicular to axis B, a second positioning surface 648 extending in a circumferential direction substantially perpendicular to axis B and displaced from first positioning surface 644 in the direction of axis B, and a generally straight transition surface 652 extending circumferentially between first positioning surface 644 and second positioning surface 648 and inclined relative to both surfaces. Transition surface 652 may slightly overshoot first positioning surface 644 as shown in FIG. 17 to provide a detenting function. A casing terminating opening 655 is used to terminate outer casing 48 of control cable 46.

Finger contact lever 612 includes an annular cable coupler portion 660, a cam follower portion 668 for contacting cam surface 640, and a finger contact portion 672. Cable coupler portion 660 rotates around axis B and includes an opening 664 for receiving wire 14 therethrough. Cable end bead 50 of wire 14 abuts against the left side of cable coupler portion 660 as shown in FIGS. 16 and 17. Both cam follower portion 668 and finger contact portion 672 extend radially outwardly from cable coupler portion 660 and axis B so that finger contact portion 672 is disposed outside of base member 608.

Figure 18:
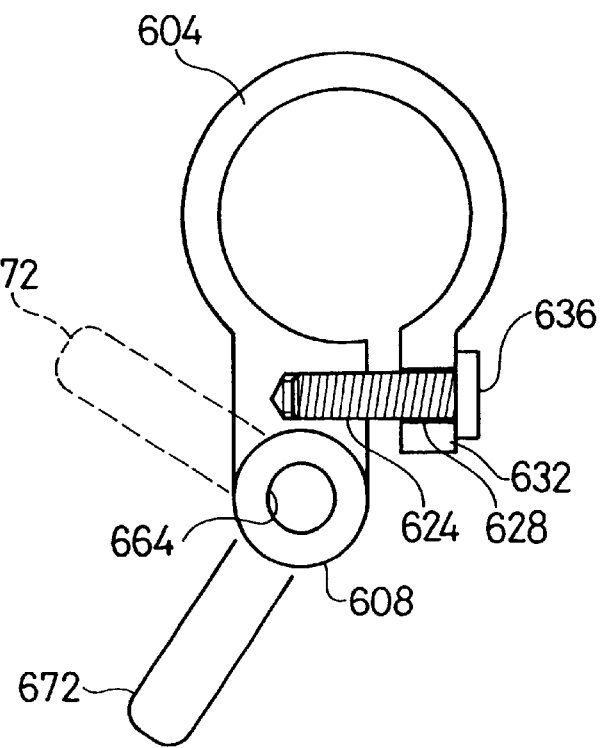
FIG. 18 is a front view of the shift control device shown in FIG. 16 illustrating the different operating positions of the shift control lever.

FIG. 18 is a front view of shift control device 600 illustrating the different operating positions of shift control lever 612. As with the other embodiments, shift control device 600 moves between a cable pulled position, wherein cam follower portion 668 abuts against first positioning surface 644 as shown in FIG. 16, to a cable released position, wherein cam follower portion 668 abuts against second positioning surface 648. This is accomplished by rotating finger contact lever 672 from the position shown in solid lines in FIG. 18 to the position shown in broken lines in FIG. 18. As finger contact lever 672 rotates, cam follower portion 668 moves within slot 638 and slides against transition surface 652 so that cable coupler portion 660 moves in the direction of axis B to the cable released position.

Figure 19:
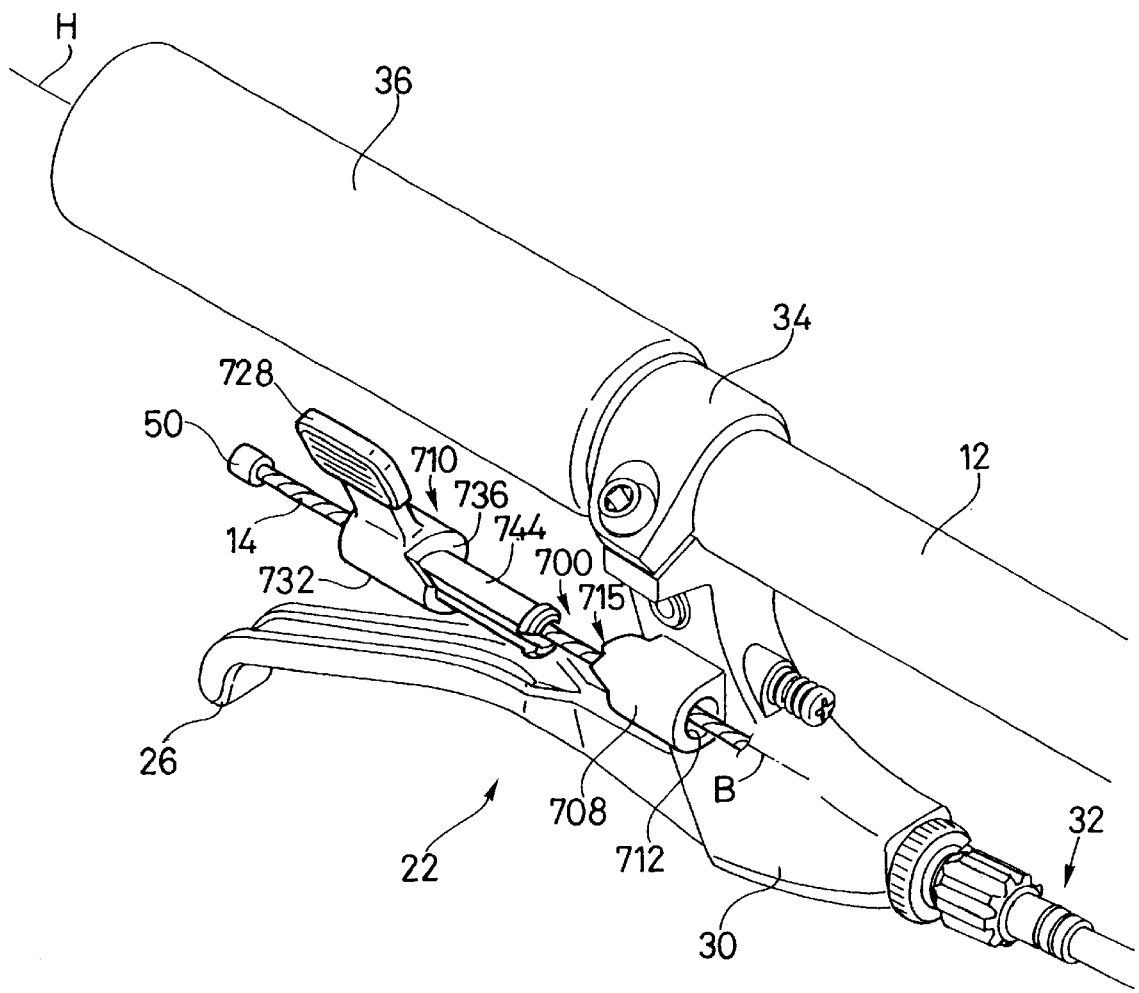
FIG. 19 is an oblique view of an eighth embodiment of a shift control device according to the present invention.
Figure 20:
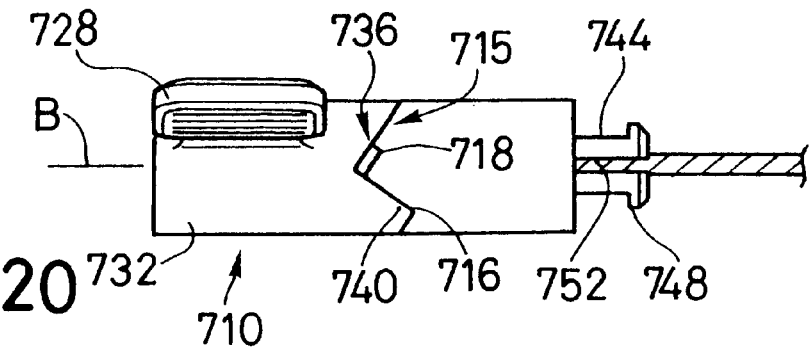
FIGS. 20–22 are side views illustrating the operation of the shift control device shown in FIG. 19.
Figure 21:
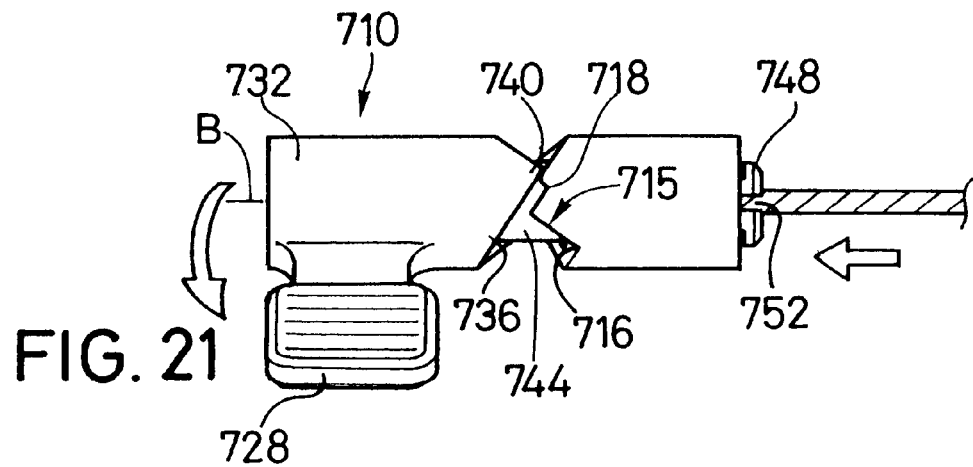
Figure 22:
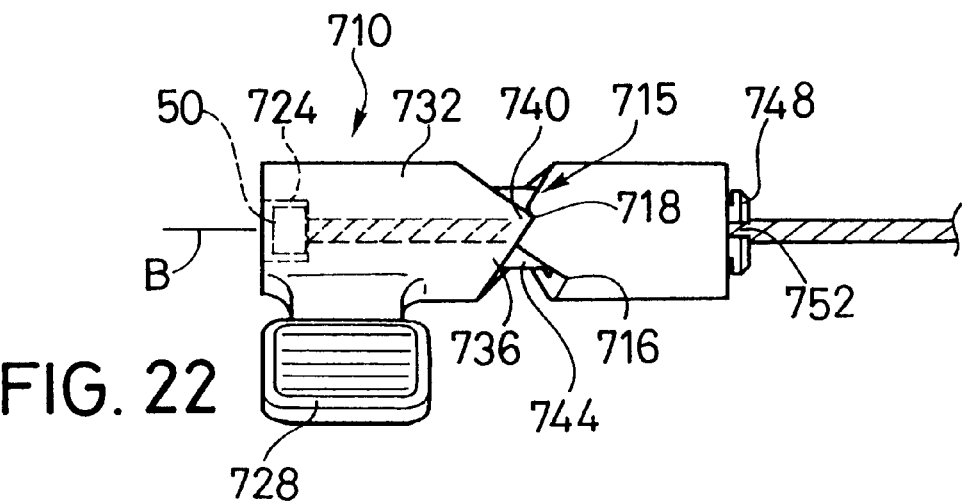

FIG. 19 is an oblique view of a shift control device 700 representing an eighth embodiment of the present invention, and FIGS. 20–22 are detailed side views illustrating the operation of shift control device 700. In this embodiment, shift control device 700 includes a generally cylindrical base member 708 integrally formed with brake control device housing 30 and a generally cylindrical rotatable member 710. Base member 708 includes a rotatable member coupling opening 712 defining a base member axis B that is coaxial with wire 14 when wire 14 is coupled to shift control device 700. Base member 708 also includes a cam surface 715 defining a pair of V-shaped first positioning surfaces or recesses 716 (FIGS. 20–22) disposed 180° from each other (only one such positioning recess 716 is shown in FIGS. 20–22) and a pair of V-shaped second positioning surfaces or recesses 718 disposed 180° from each other (again, only one such positioning recess 718 is shown in FIGS. 20–22), wherein first positioning recesses 716 are displaced from second positioning recesses 718 in the direction of axis B.

Rotatable member 710 includes a cable end bead coupling opening 724 (FIG. 22) for receiving cable end bead 50 therein, a finger contact projection 728 extending radially outwardly from a side wall 732, a cam surface 736 defining a pair of sawtooth-shaped positioning surfaces or projections 740 disposed 180° from each other (only one such positioning projection 740 is shown in FIGS. 20–22), and a tubular coupling projection 744 with a coupling flange 748. Tubular coupling projection 744 has a slot 752 so that tubular coupling projection 744 may be compressed radially to fit through rotatable member coupling opening 712 in base member 708 until coupling flange 748 is disposed on the left side of base member 708 as shown in FIGS. 20–22. This prevents rotatable member 710 from decoupling from base member 708.

Operation of shift control device 700 is shown in FIGS. 20–22. FIG. 20 shows shift control device 700 in the cable released position where positioning projections 740 engage first positioning recesses 716. To move shift control device 700 to the cable pulled position, finger contract projection 728 is pressed downward as shown in FIG. 21 to cause rotatable member 710 to rotate relative to base member 708 and to cause cam surface 736 on rotatable member 710 to slide against cam surface 715 on base member 708. This causes rotatable member 710 to move in the direction of axis B to the left as shown in FIG. 21 until positioning projections 740 engage positioning recesses 718 as shown in FIG. 22 and shift control device 700 is set in the cable pulled position.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle shift control device comprising:
a takeup element for pulling and releasing a shift control element;
only one finger contact lever that rotates around a rotational axis for moving the takeup element, wherein the finger contact lever extends radially outwardly in a direction centered at the rotational axis;
a detent mechanism for maintaining the takeup element in only two positions, a first of the two positions being a cable pulled position and a second of the two positions being a cable released position; and
wherein the detent mechanism comprises:
first and second recesses;
a detent member that is biased toward at least one of the first recess and the second recess; and
wherein at least one of the detent member, the first recess and the second recess rotate with the takeup element.

2. The device according to claim 1 wherein the finger contact lever extends outwardly from a wire pulling drum that extends around the rotational axis.

3. The device according to claim 2 wherein the finger contact lever and the wire pulling drum is one piece.

4. The device according to claim 1 wherein the finger contact lever is rotatably mounted to a mounting member, and wherein the detent mechanism further comprises a first detent projection projecting from the takeup element and a second detent projection projecting from the mounting member.

5. The device according to claim 1 further comprising a first finger contact surface disposed on a first side of a plane, wherein the first finger contact surface moves toward the plane when the takeup element moves in a cable pulling direction, and wherein the first finger contact surface moves away from the plane when the takeup element moves in a cable releasing direction.

6. The device according to claim 5 further comprising a second finger contact surface disposed on the first side of the plane, wherein the second finger contact surface moves away from the plane when the takeup element moves in the cable pulling direction, and wherein the second finger contact surface moves toward the plane when the takeup element moves in the cable releasing direction.

7. The device according to claim 6 wherein the finger contact lever is disposed between the first finger contact surface and the second finger contact surface.

8. A bicycle shift control device comprising:
a takeup element for pulling and releasing a shift control element;
only one finger contact lever that rotates around a rotational axis for moving the takeup element, wherein the finger contact lever extends radially outwardly in a direction centered at the rotational axis;
a detent mechanism for maintaining the takeup element in only two positions, a first of the two positions being a cable pulled position and a second of the two positions being a cable released position;
a first finger contact surface disposed on a first side of a plane, wherein the first finger contact surface moves toward the plane when the takeup element moves in a cable pulling direction, and wherein the first finger contact surface moves away from the plane when the takeup element moves in a cable releasing direction;
a second finger contact surface disposed on the first side of the plane, wherein the second finger contact surface moves away from the plane when the takeup element moves in the cable pulling direction, and wherein the second finger contact surface moves toward the plane when the takeup element moves in the cable releasing direction;
wherein the finger contact lever is disposed between the first finger contact surface and the second finger contact surface; and
wherein the first finger contact surface is substantially parallel to the plane when the takeup element is in the cable pulled position, and wherein the second finger contact surface is substantially parallel to the plane when the takeup element is in the cable released position.

9. The device according to claim 1 wherein both of the first and second recesses are engaged by the detent member, and wherein the detent member is biased radially toward the first and second recesses.

10. The device according to claim 9 wherein the detent member is biased radially inwardly.

11. The device according to claim 1 wherein the first and second recesses are formed on the takeup element.

12. The device according to claim 1 wherein both of the first and second recesses are engaged by the detent member, and wherein the first and second recesses are the only recesses engaged by the detent member for maintaining the takeup element in the only two positions.

13. The device according to claim 1 the takeup element and the detent mechanism are disposed within a housing.

14. The device according to claim 13 wherein the takeup element is pivotably connected to the housing.

15. The device according to claim 1 wherein both of the first and second recesses are engaged by the detent member, and wherein the detent mechanism further comprises a spring that biases the detent member toward the first and second recesses.

16. A bicycle shift control device comprising:
- a takeup element for pulling and releasing a shift control element;
- only one finger contact lever that rotates around a rotational axis for moving the takeup element, wherein the finger contact lever extends radially outwardly in a direction centered at the rotational axis;
- a detent mechanism for maintaining the takeup element in only two positions, a first of the two positions being a cable pulled position and a second of the two positions being a cable released position;
- wherein the detent mechanism comprises:
  - first and second recesses;
  - a detent member that is biased toward the first and second recesses; and
  - wherein at least one of the detent member and the first and second recesses rotate with the takeup element;
- wherein the first and second recesses are the only recesses engaged by the detent member for maintaining the takeup element in the only two positions; and
- wherein the takeup element and the detent mechanism are disposed within a housing.

17. The device according to claim 16 wherein the first and second recesses are formed on the takeup element.

18. The device according to claim 17 wherein the detent member is biased radially toward the first and second recesses.

19. The device according to claim 18 wherein the detent mechanism further comprises a spring that biases the detent member toward the first and second recesses.

20. The device according to claim 19 wherein the detent member is biased radially inwardly.

* * * * *